United States Patent
DeKam et al.

(10) Patent No.: US 12,096,710 B2
(45) Date of Patent: Sep. 24, 2024

(54) TOW HEAD FOR AGRICULTURAL IMPLEMENT AND AGRICULTURAL IMPLEMENT

(71) Applicant: CNH Industrial America LLC, New Holland, PA (US)

(72) Inventors: Monte Lee DeKam, Westmont, IL (US); Austin Joseph McLuckie, Morris, IL (US); Kregg Jerome Raducha, Chicago, IL (US); Leonardo Reis Menezes, Piracicaba (BR); Carlos Henrique Spiacci Correia, Santa Barbara D'Oeste (BR)

( * ) Notice: Subject to any disclaimer, the term of this patent is extended or adjusted under 35 U.S.C. 154(b) by 632 days.

(21) Appl. No.: 17/331,323

(22) Filed: May 26, 2021

(65) Prior Publication Data
US 2022/0377958 A1    Dec. 1, 2022

(51) Int. Cl.
| | | |
|---|---|---|
| *A01B 73/02* | (2006.01) | |
| *A01B 76/00* | (2006.01) | |
| *A01C 7/20* | (2006.01) | |
| A01B 73/06 | (2006.01) | |

(52) U.S. Cl.
CPC .............. *A01B 73/02* (2013.01); *A01B 76/00* (2013.01); *A01C 7/208* (2013.01); *A01B 73/065* (2013.01)

(58) Field of Classification Search
CPC ....... A01B 73/02; A01B 73/065; A01B 76/00; A01C 7/208
USPC ................................................. 172/311, 776
See application file for complete search history.

(56) References Cited

U.S. PATENT DOCUMENTS

| | | | |
|---|---|---|---|
| 238,651 A  * | 3/1881 | Cockshutt ............ | A01B 73/044 |
| | | | 172/776 |
| 1,706,257 A | 3/1929 | Ronning et al. | |
| 1,827,125 A | 10/1931 | Towner | |
| 1,898,353 A | 2/1933 | Everett et al. | |
| 2,251,500 A | 8/1941 | Short | |

(Continued)

FOREIGN PATENT DOCUMENTS

| | | | |
|---|---|---|---|
| GB | 1536188 | 12/1978 | |
| WO | WO-2017138868 A1 * | 8/2017 | ............. A01B 15/14 |

OTHER PUBLICATIONS

Tractor by Net, 3-Point Hitch 3pt Draft Arm Broken-3720, https://www.tractorbynet.com/forums/john-deere-owning-operating/162159-3pt-draft-arm-broken-3720-a.html, Jan. 22, 2010, 7 pgs.

(Continued)

*Primary Examiner* — Thomas B Will
*Assistant Examiner* — Joel F. Mitchell
(74) *Attorney, Agent, or Firm* — Rebecca Henkel; Rickard K. DeMille; Peter K. Zacharias

(57) ABSTRACT

A tow head for agricultural implements, particularly those intended for the distribution of seeds, composts, fertilizers, herbicides, pesticides, or fungicides in the field, is designed to promote a structural reinforcement that heightens resistance and, accordingly, improve the conditions of operation of these agricultural equipment. More particularly, a tow head for agricultural implements is formed by a telescopic center bar from which angularly designed sidebars are projected from the coupling end, and which are connected to the respective side wings of the structural chassis of the agricultural implement, and the sidebars are endowed with a reinforcement that is fixed along at least part of the longitudinal length of each sidebar.

8 Claims, 5 Drawing Sheets

(56) References Cited

U.S. PATENT DOCUMENTS

| | | | | | |
|---|---|---|---|---|---|
| 3,620,550 | A | * | 11/1971 | Hornung | A01B 73/02 |
| | | | | | 280/639 |
| 3,791,673 | A | * | 2/1974 | Hornung | B60B 35/1072 |
| | | | | | 280/421 |
| 4,717,165 | A | * | 1/1988 | Johnson | B60P 3/1066 |
| | | | | | D34/28 |
| 5,488,996 | A | * | 2/1996 | Barry et al. | A01B 73/065 |
| | | | | | 172/311 |
| 6,240,860 | B1 | * | 6/2001 | Forchino | A01C 7/208 |
| | | | | | 403/197 |
| 7,604,068 | B1 | * | 10/2009 | Friesen | A01B 73/065 |
| | | | | | 172/311 |
| 8,881,841 | B1 | * | 11/2014 | Kooima et al. | A01B 23/04 |
| | | | | | 172/776 |
| 9,743,576 | B2 | * | 8/2017 | Gadzella et al. | A01B 15/14 |
| 9,801,324 | B2 | * | 10/2017 | Lykken | A01B 73/065 |
| 9,951,888 | B2 | * | 4/2018 | Boriack | F16L 3/13 |
| 2019/0246546 | A1 | * | 8/2019 | Sheppard et al. | A01B 51/04 |
| 2021/0400861 | A1 | * | 12/2021 | de Carvalho et al. | |
| | | | | | A01B 63/006 |

OTHER PUBLICATIONS

Green Tractor Talk, DIM (Did It Myself) 3 pt. Hitch, https://www.greentractortalk.com/threads/dim-did-it-myself-3-pt-hitch.39154/, Jan. 2, 2016, 11 pgs.

* cited by examiner

TOW HEAD FOR AGRICULTURAL IMPLEMENT AND AGRICULTURAL IMPLEMENT

FIELD

The present disclosure refers, in general, to a new proposal for a tow head to be used in agricultural implements, particularly for so-called planters and seeders, and the tow head comprises technical, constructive, and functional characteristics designed and developed to promote a structural reinforcement that heightens resistance and, accordingly, promotes better operating conditions of this agricultural equipment.

The present disclosure also refers to a new agricultural implement, such as a planter or sower, which comprises this newly proposed tow head.

BACKGROUND

Several models of agricultural implements are known in the state of the art, for example planters and sowers that are used for the distribution of seeds, composts, fertilizers, herbicides, pesticides, and fungicides on the planting lines in the field. As persons skilled in the art will appreciate, these types of agricultural implements can be of the self-propelled type or not, and in the latter case, are towed by a work vehicle, for example, a tractor.

Usually, these implements have a rigid structural chassis that is mounted on gears installed at strategic points to allow their displacement, and this structural chassis also supports a plurality of planting line units that are installed longitudinally along the entire length of the structural chassis, each planting line unit being responsible for cutting the straw, opening a groove in the soil, applying compost/fertilizer, depositing the seeds at a desired depth, covering the groove and compacting the soil. Usually, these implements also include silos and tanks for the storage of seeds, composts, fertilizers, herbicides, pesticides, and fungicides that end up also being supported by this structural chassis.

Due to technological developments and the ability to increase productivity with the significant rise in the number of planting line units supported by the structural chassis of these agricultural implements, it was observed that the dimensions, but mainly the width of agricultural implements, became considerably large, restricting and preventing movement outside the planting areas, for example, on roads and highways. To this end, those large and high capacity agricultural implements have become composed of segments that can be retracted, folded to somehow reduce the width and allow the safe transport thereof.

By way of example, some models called "front fold" are known in the state of the art or also called "self-transportable or articulated planters". As persons skilled in the art will appreciate, these models of equipment are configured so that the side structures of the chassis, or side wings, can be bent or retracted forward, up or any position in order to reduce the width of the agricultural implement and thus promote better transport conditions.

Particularly in the case of these front fold planters, these side wings are folded or retracted through a dynamic head, which is configured to promote a telescopic displacement of their structure to thus provide the opening and closing of the side wings. Therefore, as persons skilled in the art will appreciate, the large planters and seeders of great size and high productivity known in the state of the art comprise a head formed by a telescopic central bar from which sidebars are projected angularly outward and whose ends of these sidebars are mounted on respective side wings. Accordingly, at the moment when the telescopic central bar is extended, the sidebars end up, in a way, pulling the respective side wings that perform a movement of closing or recoil and, with this, placing the agricultural implement in the closed configuration for transport. On the other hand, when the telescopic central bar performs the retraction movement, the sidebars end up pushing and causing the opening of the side wings, configuring the agricultural implement in an operating condition.

During these operations of opening and closing the side wings, a great risk was noted that these sidebars of the tow head do not resist the strain and, depending on the conditions of the terrain where these operations are being performed of opening and closing the side wings, they can be significant to the point of affecting these sidebars, for example, causing the buckling or bending/arching of the bars and, accordingly, requiring eventual maintenance stops that, in the end, affect the productivity of the work and the harvest as a whole.

An option considered in the state of the art to avoid this type of drawback would be to increase the dimensions of the sidebars to heighten the resistance. However, in practice, it was found unfeasible to apply this solution, since the dimensional increase of these sidebars would compromise the proper functioning of the equipment, as it would affect other mechanisms and parts of the agricultural implement, and may even require an overall project review, which proved impractical considering that the cost-benefit ratio was not motivating.

Thus, as can be seen, the agricultural implements, of the planter and sower type, known in the state of the art, lack a practical, functional, and principally an efficient solution, which makes it possible to obtain more resistant tow heads and, at the same time, with the ability to avoid any structural deformation usually caused by buckling loads during the processes of opening and closing the side wings of large planters and seeders.

Thus, it was found that the proposals known in the state of the art to improve and heighten the resistance of the sidebars of the tow heads, particularly during the processes of opening and closing the side wings, were not efficient, and may compromise the work operations of these agricultural implements, which, in the end, end up affecting the productivity of the activities and the interests of farmers. Therefore, these are, among others, the drawbacks and limitations that are intended to be solved with the development of the present disclosure.

BRIEF DESCRIPTION

Therefore, according to the above, the objective of the present disclosure is to provide a new proposal for the tow head for agricultural implements, particularly those intended for the distribution of seeds, composts, fertilizers, herbicides, pesticides, and fungicides in the field, such as planters and seeders, and this new tow head was designed and developed to obtain a practical solution, functional and efficient to the problems, limitations, and drawbacks disclosed in the state of the art, as summarized above.

More particularly, it is one of the objectives of the present disclosure to provide a new tow head for agricultural implements that comprises technical, constructive, and functional characteristics capable of significantly heightening the resistance of the sidebars that assist in the opening and closing of the side wings of the agricultural implements to improve the operating conditions, but mainly avoid structural deformation caused by the common buckling loads that these heads end up undergoing during the operations of opening and closing the wings, but also during the process of depositing material as the agricultural implement moves along the field.

It is an objective of the present disclosure to provide an agricultural implement, intended for the distribution of seeds, composts, fertilizers, herbicides, pesticides, and fungicides in the field, such as a planter, sower, composter or a sprayer, which comprises a tow head as commented above.

Therefore, in order to achieve the technical and functional improvements summarized above, among others, the present disclosure refers to a new proposal for the tow head of an agricultural implement, and the tow head is essentially formed by a telescopic central bar from which angularly designed sidebars are projected from the coupling end, and which are connected to the respective side wings of the structural chassis of the agricultural implement, and each sidebar comprises a reinforcement fastened along at least part of the longitudinal length of the sidebar.

According to a particular embodiment of the present disclosure, each reinforcement fastened along at least part of the longitudinal extent of the respective sidebar may comprise a structure with an angled configuration. More particularly, the reinforcement may be, for example, a corner including a V-shaped folded plate.

Additionally, according to another embodiment of the present disclosure, each reinforcement can be applied on ¾ of the total length of the respective sidebar.

According to a further particular embodiment of the present disclosure, each reinforcement is fixed on the respective sidebar by means of appropriate welds.

Also, according to another embodiment of the tow head, object of the present disclosure, each reinforcement can be equipped with supports for fastening and assembling the hydraulic hose clamps of the hydraulic system of agricultural implements. Optionally, each support can be fitted with a hole and include a respective plate associated with the reinforcement.

Also, as mentioned above, the present disclosure refers to an agricultural implement, which is configured for distribution of seeds, composts, fertilizers, herbicides, pesticides, and fungicides in the field, and which comprises a structural chassis supported by at least one wheelset and also has tool bars on which are installed several planting line units, in which this structural chassis can be formed by a central section and side wings. The structural chassis is configured to be arranged in a condition of transport and in a condition of operation or work, and this agricultural implement comprises a tow head as defined above.

According to a possible embodiment of the present disclosure, the agricultural implement can comprise over 40 (forty) planting line units distributed along the longitudinal length of the central section and side wings.

Finally, according to another embodiment of the present disclosure, this agricultural implement can be, for example, a planter, a sower, a composter, or a sprayer.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
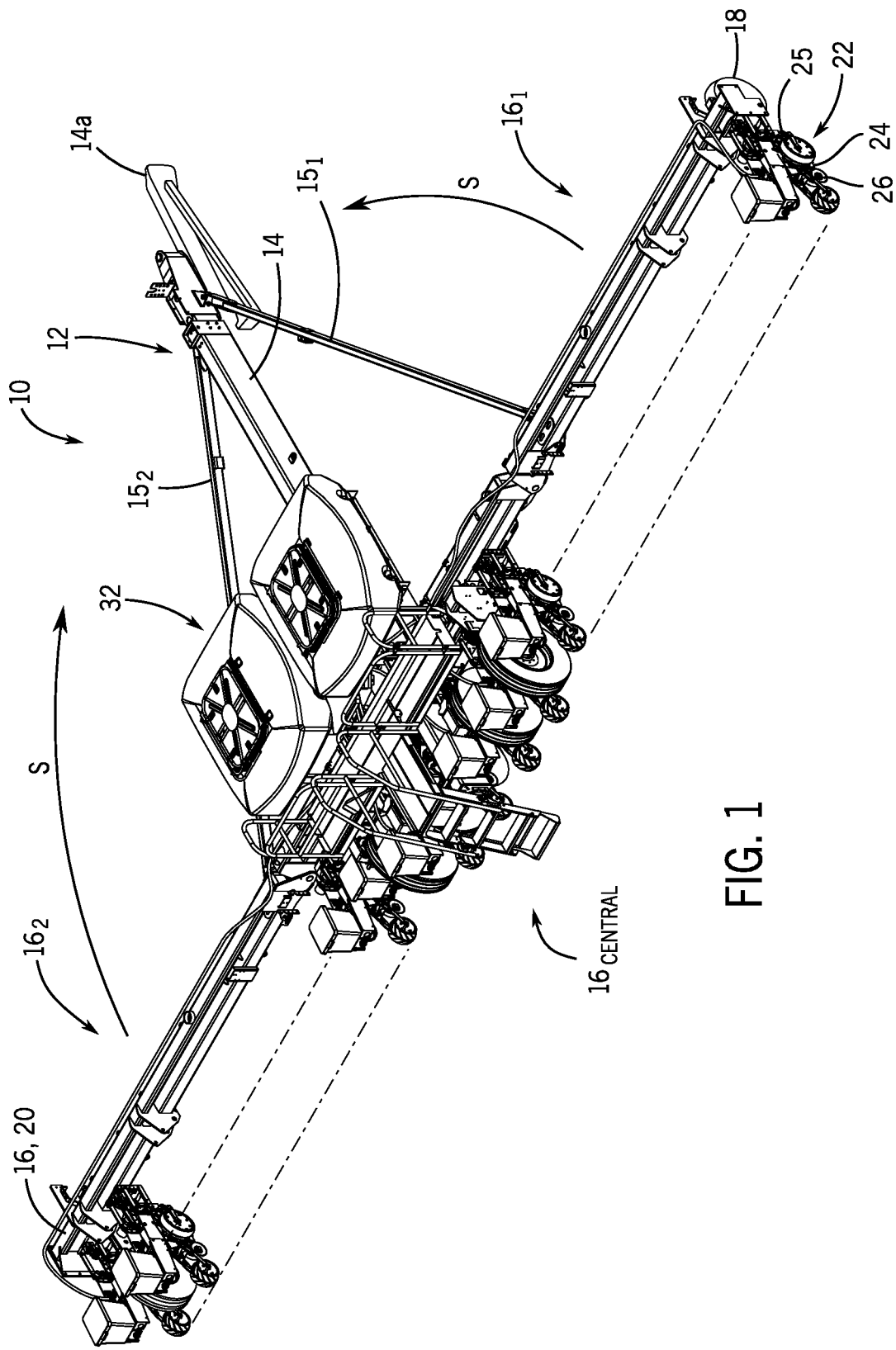
FIG. 1 is a schematic perspective view of an agricultural implement model that can comprise the new tow head according to the present disclosure.
Figure 2:
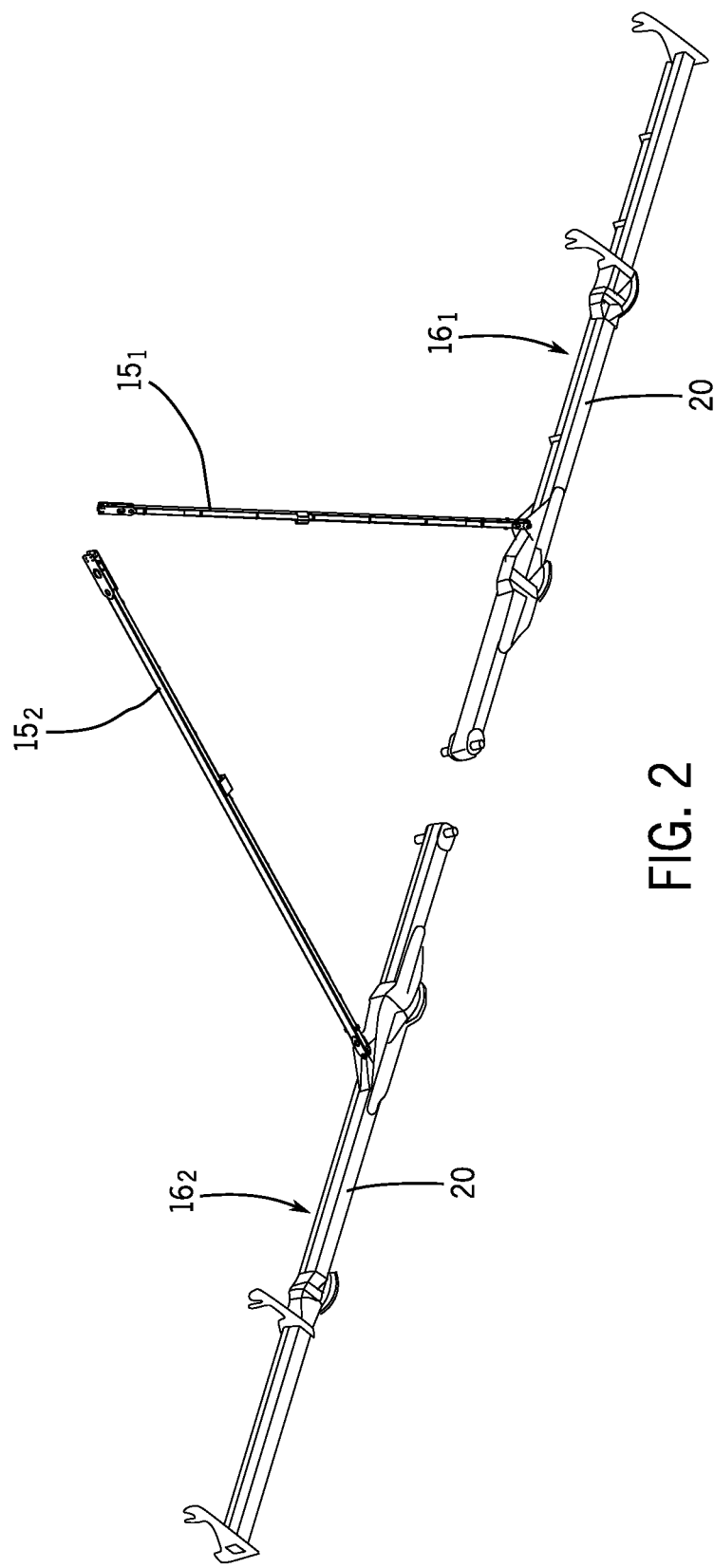
FIG. 2 is a perspective view of the sidebars of the tow head associated with the respective side wings, according to an embodiment of the present disclosure.
Figure 3:
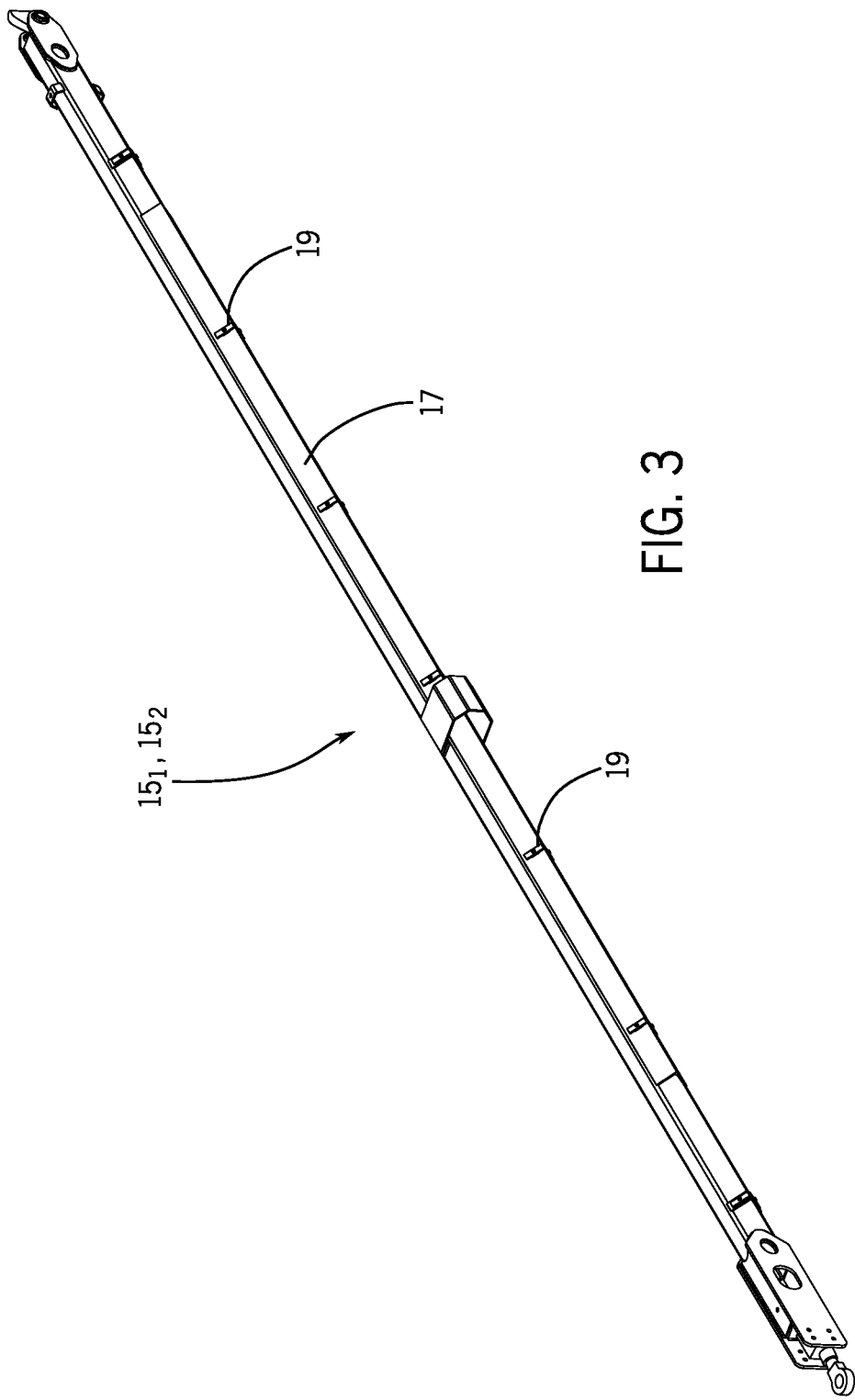
FIG. 3 is another view in a schematic perspective of one of the sidebars of the tow head, according to the present disclosure.
Figure 4:
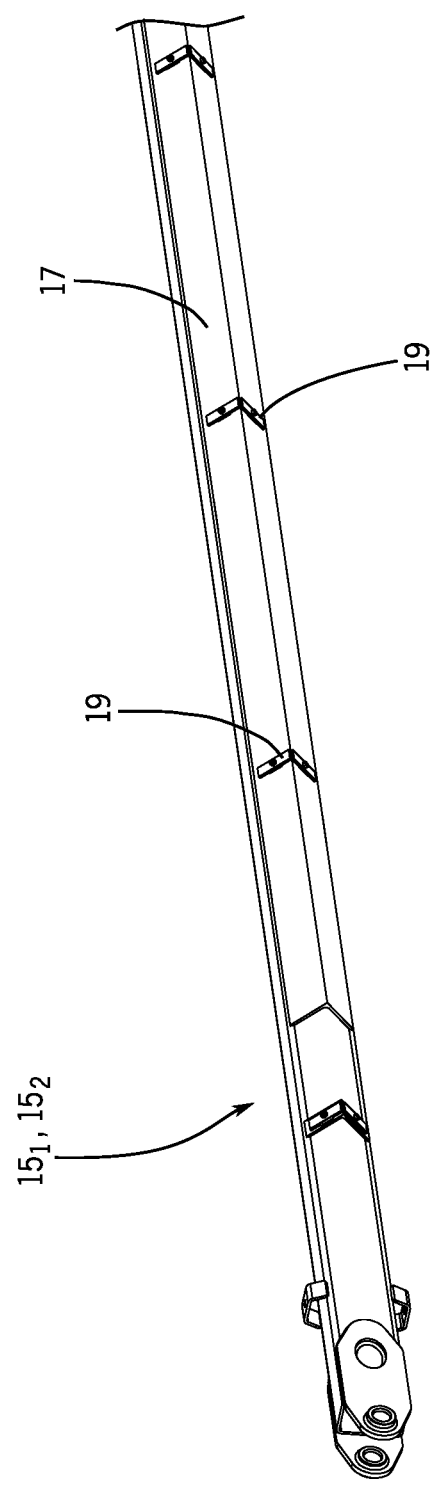
FIG. 4 is an enlarged perspective view of a section of the sidebar of the tow head, according to the present disclosure.
Figure 5:
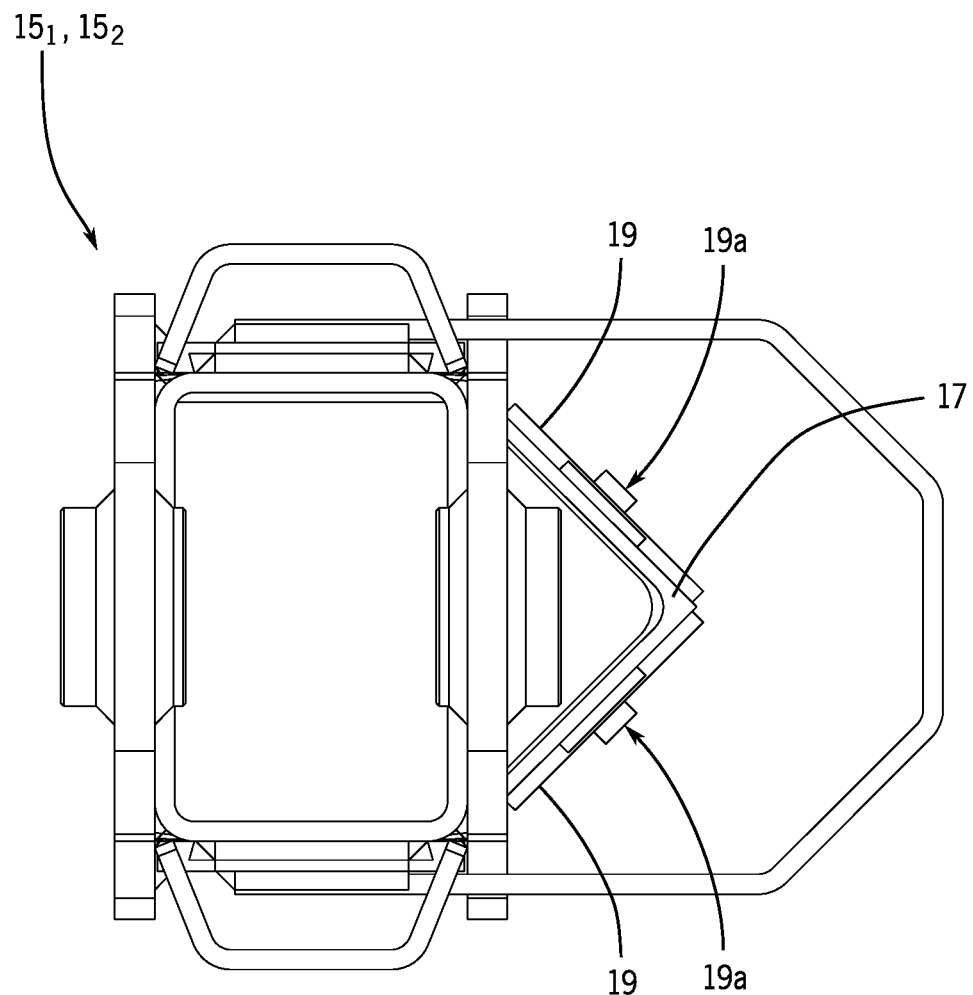
FIG. 5 is a front view of the sidebar of the tow head, according to the present disclosure.

Now, with reference to the accompanying drawings and, more specifically, FIG. 1, an agricultural implement 10 is represented, which is used in the distribution of seeds, composts, fertilizers, herbicides, pesticides, and fungicides on the planting lines in the field, such as so-called planters and seeders. The agricultural implement 10 is configured to be towed along the field by a work vehicle, such as, for example, a tractor. As persons skilled in the art will appreciate, these agricultural implement models 10 are formed by a tow head 12 designed to, on the one hand, engage the work vehicle, and on the other hand, sustain the structural chassis 16 that is mounted on at least one wheelset 18 and also has tool bars 20 in which are installed several planting line units 22.

Each planting line unit 22 can include a connection structure, one or more opening disks 24 configured to form a seed groove in the soil, and the penetration depth of these opening disks 24 is adjusted and controlled by means of regulatory wheels 25. Furthermore, the planting line unit 22 may include a system for the distribution of agricultural products (e.g. seed tubes or motorized distributors of agricultural products) configured to deposit seeds and/or other agricultural products (e.g. composts, fertilizers, herbicides, pesticides, fungicides, etc.) in the groove of seeds formed in the soil. In addition, the planting line unit 22 may include cover disk(s) 26 and/or a compacting wheel positioned at the back of the planting line unit 22. As persons skilled in the art will appreciate, the cover disks 26 are configured to move the displaced soil back to the seed groove, and the compacting wheel is configured to firm the soil and provide better contact conditions between the seeds and the soil.

The agricultural implement 10 also includes silos or tanks 32 intended for the storage of seeds and/or compost/fertilizer, and in the case of large and high capacity planters, or also called "front fold", this agricultural equipment is configured so that the side structures of the chassis $16_1$, $16_2$, also known as side wings, can be retracted or folded forward to provide better transport conditions, these silos or tanks 32 are usually positioned in the central part of the structural chassis 16, and are connected by a pneumatic system to the planting line units 22 to provide the correct distribution of seeds, composts, fertilizers, herbicides, pesticides, and fungicides in the field.

An agricultural implement 10, as described in this document, may, as a reference, be a planter model produced by CNH INDUSTRIAL®, commercialized under the CASE IH® and NEW HOLLAND® marks.

The terms referred to herein such as agricultural implement, planter, seeder and its variants are used indistinctly to designate equipment or a machine designed and configured to promote the distribution of seeds, composts, fertilizers, herbicides, pesticides, and fungicides in the soil.

Still with particular reference to FIG. 1, the large and high capacity agricultural implement 10 comprises, in this example, multiple planting line units 22 (e.g., 40, 61, etc.) arranged side by side along the entire longitudinal length of the structural chassis 16, which is formed by a central section $16_{central}$, from which the side sections, or side wings $16_1$, $16_2$, are projected. The structural chassis 16 is configured to be arranged in the working condition, in which the side wings $16_1$, $16_2$ are in the open position, or in the transport condition, in which the side wings $16_1$, $16_2$ are folded or retracted, such as the movements indicated by the arrows (S).

Thus, in view of the context presented above, and with reference to the other accompanying schematic drawings, it is verified that the tow head 12, according to the present disclosure, is basically formed by a telescopic central bar 14 and sidebars $15_1$, $15_2$, which are angularly projected from the coupling end 14a. The sidebars $15_1$, $15_2$ are connected to the respective side wings $16_1$, $16_2$ of the structural chassis 16, and each sidebar $15_1$, $15_2$ comprises a reinforcement 17 fastened along at least part of the longitudinal length of the sidebar $15_1$, $15_2$.

Each reinforcement 17 fastened to a respective sidebar $15_1$, $15_2$, according to a particular embodiment of the present disclosure, comprises a structure with angled configuration, and may be, for example, a corner including a V-shaped folded plate, which promotes heightened resistance and, at the same time, does not interfere significantly in the weight of the sidebars $15_1$, $15_2$.

According to a particular embodiment of the present disclosure, each reinforcement 17 is applied about ¾ of the total length of the respective sidebar $15_1$, $15_2$, which proves to be sufficient to provide heightened resistance and improve working conditions during the operations of opening and closing the side wings $16_1$, $16_2$, as well as the strain usually noticeable during the work of seed depositing and application of substances in the field.

These reinforcements 17 may be fastened to the respective sidebars $15_1$, $15_2$ by means of appropriate welds or any other equivalent means capable of securely and firmly fastening them.

Optionally, according to another possible embodiment of the present disclosure, the reinforcement 17 can be equipped with supports 19 intended for fastening and assembling clamps used to secure the hydraulic hoses of the hydraulic system of the agricultural implement 10. Particularly, according to a possible embodiment of the present disclosure, each support 19 includes a hole 19a, and each support can be formed by a respective plate associated with the reinforcement 17.

Therefore, it turns out that the new proposal for the tow head 12 for agricultural implements 10, according to the present disclosure, manages to improve the working conditions of this equipment, but principally avoids the risks of deformation and functional impairment of agricultural implements due to overloads applied to the mechanisms responsible for the operations of opening and closing the side wings $16_1$, $16_2$ and, therefore, substantially reducing or eliminating any problems that could interfere in the efficiency and productivity of work during seed deposition and/or application of composts, fertilizers, herbicides, pesticides, and fungicides on the planting lines in the field.

Additionally, as mentioned above, the present disclosure also refers to an agricultural implement 10 for the distribution of seeds, composts, fertilizers, herbicides, pesticides, and fungicides in the field, which comprises a structural chassis 16 that is supported by at least one wheelset 18 and also has tool bars 20 in which several planting line units 22 are installed. The structural chassis 16 is formed by a central section $16_{central}$, from where side wings $16_1$, $16_2$ are projected. The structural chassis 16 is configured to be arranged in a transport condition, in which the side wings $16_1$, $16_2$ are folded or retracted, and in a condition of operation or work, in which the side wings $16_1$, $16_2$ are opened or extended, and the agricultural implement comprises a tow head 12 as defined and presented above.

According to possible and particular embodiments of the present disclosure, the agricultural implement 10 can comprise over 40 planting line units 22 distributed along the longitudinal extension of the central section $16_{central}$ and side wings $16_1$, $16_2$.

According to possible embodiments of the present disclosure, this agricultural implement 10 can be a planter, sower, composter, or a sprayer.

Finally, considering all the above, it is important to highlight that the objective of this description is solely to present and define in an exemplary manner particular embodiments of the newly proposed tow head 12 for agricultural implements 10, according to the present disclosure. Therefore, as persons skilled in the art will appreciate, several modifications and combinations of elements and equivalent details are possible without straying from the scope of protection defined by the accompanying claims.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tow head for an agricultural implement, comprising:
a telescopic central bar from which a plurality of sidebars is angularly projected from a coupling end of the telescopic central bar, wherein each sidebar of the plurality of sidebars is connected to a respective side wing of a structural chassis of the agricultural implement, and each sidebar of the plurality of sidebars has a respective exterior surface; and
a plurality of reinforcements, wherein each reinforcement of the plurality of reinforcements is fastened along at least part of a longitudinal length of a respective sidebar of the plurality of sidebars;
wherein at least one reinforcement of the plurality of reinforcements has a V-shaped cross-sectional shape, the at least one reinforcement has a first portion and a second portion, the first and second portions intersect at an intersection to form the V-shaped cross-sectional shape, and the first and second portions extend from the intersection to the exterior surface of the respective sidebar along an entire length of the at least one reinforcement.

2. The tow head for the agricultural implement, according to claim 1, wherein at least one reinforcement of the plurality of reinforcements is applied on 75 percent of a total length of the respective sidebar.

3. The tow head for the agricultural implement, according to claim 1, wherein at least one reinforcement of the plurality of reinforcements is fastened on the respective sidebar through appropriate welds.

4. The tow head for the agricultural implement, according to claim 1, comprising a plurality of supports coupled to at least one reinforcement of the plurality of reinforcements, wherein the plurality of supports is configured to fasten to hydraulic hose clamps of a hydraulic system of the agricultural implement.

5. The tow head for the agricultural implement, according to claim 4, wherein each support of the plurality of supports comprises a hole and is formed by a respective plate.

6. An agricultural implement configured to distribute seeds, composts, fertilizers, herbicides, pesticides, or fungicides in a field, wherein the agricultural implement comprises a structural chassis supported by at least one wheelset, the structural chassis is formed by a central section and a plurality of side wings, the structural chassis is configured to be arranged in a condition of transport and in a condition of operation or work, and the agricultural implement comprises a tow head comprising:
a telescopic central bar from which a plurality of sidebars is angularly projected from a coupling end of the telescopic central bar, wherein each sidebar of the plurality of sidebars is connected to a respective side wing of the plurality of side wings, and each sidebar of the plurality of sidebars has a respective exterior surface; and
a plurality of reinforcements, wherein each reinforcement of the plurality of reinforcements is fastened along at least part of a longitudinal length of a respective sidebar of the plurality of sidebars;
wherein at least one reinforcement of the plurality of reinforcements has a V-shaped cross-sectional shape, the at least one reinforcement has a first portion and a second portion, the first and second portions intersect at an intersection to form the V-shaped cross-sectional shape, and the first and second portions extend from the intersection to the exterior surface of the respective sidebar along an entire length of the at least one reinforcement.

7. The agricultural implement, according to claim 6, comprising a plurality of planting line units distributed along a longitudinal length of the central section and the plurality of side wings.

8. The agricultural implement, according to claim 6, wherein the agricultural implement comprises a planter, a seeder, a composter, or a sprayer.

* * * * *